Nov. 21, 1933.  A. E. MANION  1,936,557
BLOWER
Filed Aug. 15, 1931  2 Sheets-Sheet 1
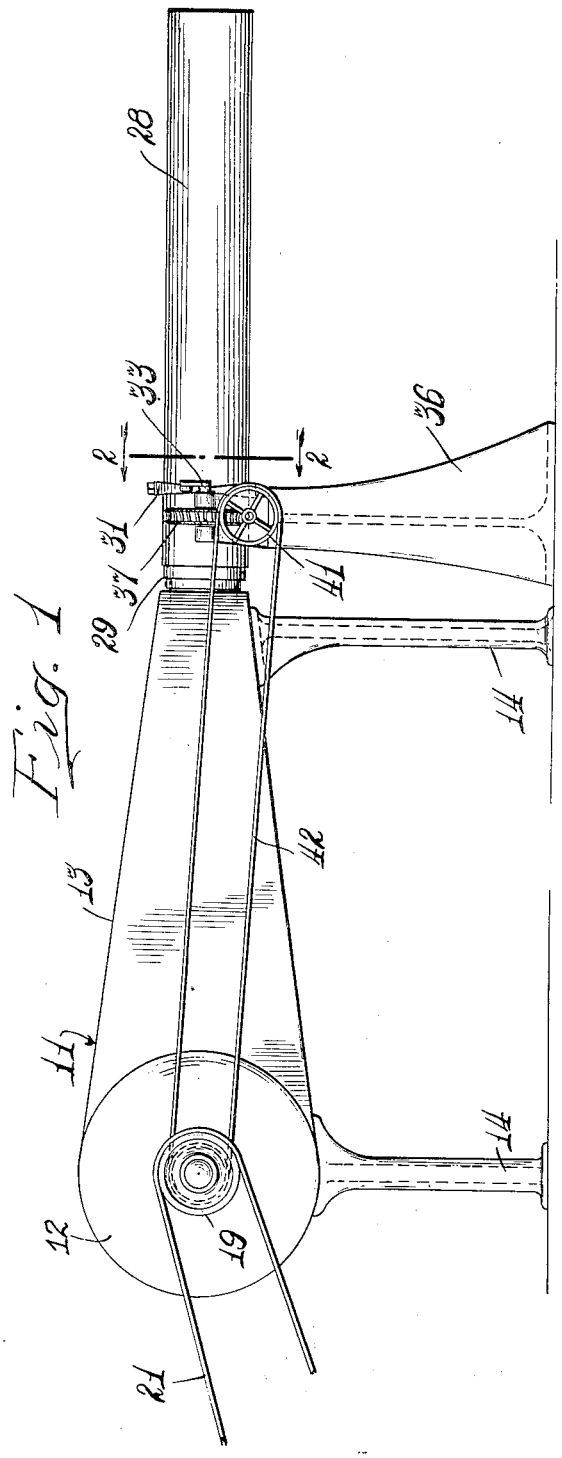
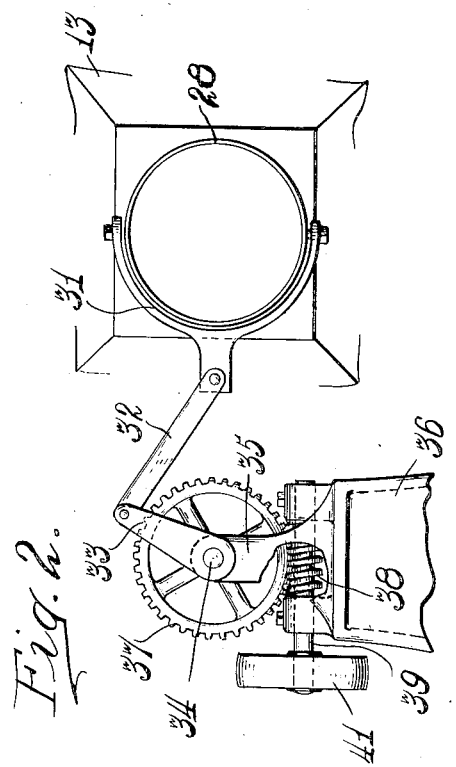
Inventor
Allen E. Manion
Daniel S. Zumau
Attorney.

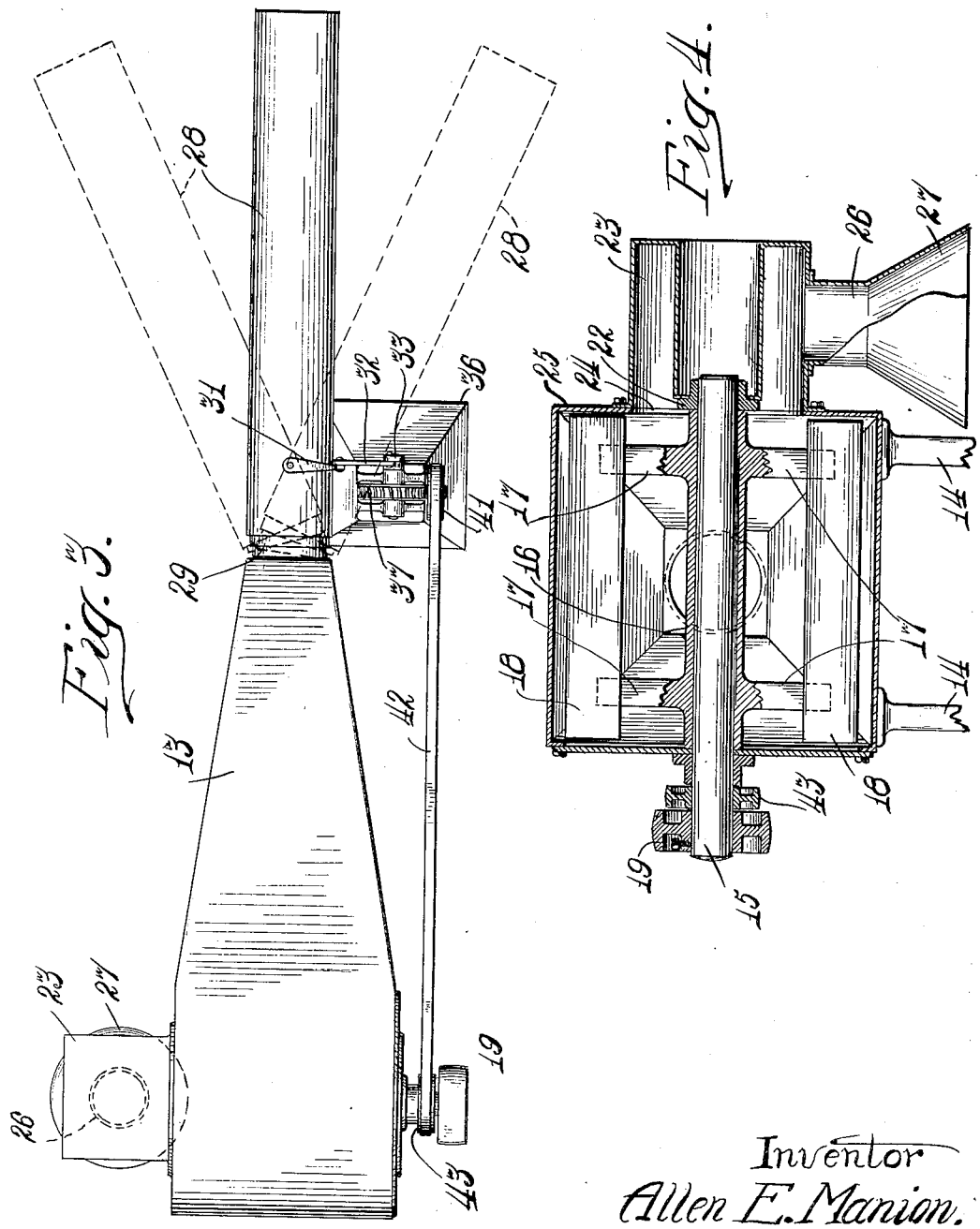

Patented Nov. 21, 1933

1,936,557

UNITED STATES PATENT OFFICE 1,936,557

BLOWER

Allen E. Manion, Miami, Fla.

Application August 15, 1931. Serial No. 557,255

1 Claim. (Cl. 230—133)

The invention relates to improvements in blowers and more particularly to an improved apparatus adapted to distribute smoke or warm air over orchards, or the like, to prevent injury to the vegetation therein by cold weather, frost, or insects.

An object of the invention is to provide an improved apparatus for protecting vegetation against injury from frost.

Another object is to provide a device of the character referred to with means to effect even distribution, at a high velocity, over a large area of an orchard, or the like, of smoke or warm air for destroying insects, or for protecting the vegetation against injury from cold weather or frost.

The foregoing and such other objects of the invention as will appear hereinafter as the description proceeds, will be more readily understood from a perusal of the following specification, reference being had to the accompanying drawings, in which:

Fig. 1 is a side elevational view of the improved apparatus.

Fig. 2 is a transverse sectional view, taken substantially on line 2—2 of Fig. 1.

Fig. 3 is a plan view of the blower.

Fig. 4 is a vertical transverse sectional view through the blower fan and housing.

The improved apparatus is adapted for use in orchards, or the like, particularly when such fields are low, or in valleys, whereby the vegetation therein is subject to becoming frost-bitten. Frost, and the damage caused thereby, generally result only from a lack of air circulation in and about the trees, shrubs, or other vegetation.

The improved apparatus is designed to distribute smoke or warm air effectively over a comparatively large area of the orchard, or other field, at high velocity, thus protecting it against frost, and driving therefrom insect life. As shown in the accompanying drawings, the improved blower apparatus preferably includes a housing 11 having a power operated blower fan 12 arranged in one end and a spout 13, substantially square in cross section, extending horizontally therefrom. The housing 11 is supported by legs 14 at a suitable distance above the ground, or it may be mounted upon a truck or other wheeled vehicle (not shown).

The blower fan 12 preferably includes a shaft 15 extending transversely through and journaled in the housing 11. A sleeve 16 is fixedly secured on shaft 15, said sleeve having circumferentially spaced radial arms 17 carrying fan blades 18 on their ends. The shaft 15 extends through one wall of the housing, and has on its extended end a pulley 19 adapted to receive a belt 21 thereover for transmitting power to the blower fan from a suitable source of supply.

The other end of the shaft 15 is journaled in bearing 22 mounted within an annular chamber 23 arranged over an opening 24 in the side wall 25 of the housing 11. Depending from and in communication with the chamber 23, is a conduit 26 flared on its lower open end, as at 27, to receive smoke or warm air rising from a fire arranged therebelow. Smoke or warm air entering the flared end 27 of the conduit 26 passes through the chamber 23 and into the housing 11, from where it is violently discharged through spout 13 into and through an extension 28 arranged thereon. The extension 28 preferably is cylindrical in cross section and is connected with the discharge spout 13 by a flexible connection 29 of known construction.

Improved means is provided to move, reciprocably, the extension 28 through an arc in a horizontal plane to effect wide even distribution of the smoke or warm air over the field. Such means preferably includes a suitable yoke 31, having its forked end pivotally connected with the extension 28 and its other end connected by a link 32 with a crank arm 33 fixedly mounted upon one end of a stud shaft 34. The stud shaft 34 is journaled in spaced bearings 35 preferably mounted upon a standard 36 arranged, as shown, spaced from one side of the blower construction. Mounted upon the shaft 34 between bearings 35 is a gear 37 which meshes with a worm gear 38 carried on a driven shaft 39 also supported by the standard 36. One end of the shaft 39 extends through bearings on the standard 36 and has fixedly secured thereon a pulley 41 for receiving and transmitting power to the crank arm 33 through gears 37 and 38 and belt 42 from the driven pulley on shaft 15.

Rotation of the crank arm 33 swings the extension 28 through an arc into substantially the positions illustrated in dotted lines in Fig. 3. It readily can be understood that a very efficient and practical smudge or hot-air distributing device is provided by the improved structure, which may be inexpensively manufactured and maintained. The standard 36 may be dispensed with, and the bearings 35 with their associated parts may be supported upon suitable means extending forwardly of the forward legs 14.

Although a preferred embodiment of the invention has been illustrated in the accompanying drawings and described in detail in the foregoing specification, it is to be understood that the apparatus may incorporate various modifications in the detail structure and the arrangement of parts without departing from the spirit of the invention or the scope of the appended claim.

I claim:

An apparatus of the class described including a housing having a blower fan therein provided with a downwardly directed intake for said fan comprising, in combination, a horizontally disposed discharge spout, a movable extension on said spout, means to move said extension operable by the fan operating means, said means comprising a train of gears mounted in a support, a crank arm operably connected with said gears, and a yoke connecting through a link said crank arm with said movable spout whereby said spout is moved through an arc in a horizontal plane upon operation of said blower fan.

ALLEN E. MANION.